United States Patent
Krishnamoorthy et al.

(10) Patent No.: US 11,243,749 B1
(45) Date of Patent: Feb. 8, 2022

(54) SYSTEMS AND METHODS FOR ASSISTED CODE DEVELOPMENT

(71) Applicant: BANK OF AMERICA CORPORATION, Charlotte, NC (US)

(72) Inventors: Madhusudhanan Krishnamoorthy, Tamilnadu (IN); Anbarasan Murthy, Tamilnadu (IN)

(73) Assignee: BANK OF AMERICA CORPORATION, Charlotte, NC (US)

( * ) Notice: Subject to any disclaimer, the term of this patent is extended or adjusted under 35 U.S.C. 154(b) by 0 days.

(21) Appl. No.: 17/210,807

(22) Filed: Mar. 24, 2021

(51) Int. Cl.
 *G06F 8/36* (2018.01)

(52) U.S. Cl.
 CPC ...................... *G06F 8/36* (2013.01)

(58) Field of Classification Search
 None
 See application file for complete search history.

(56) References Cited

U.S. PATENT DOCUMENTS

| | | | |
|---|---|---|---|
| 7,490,167 B2 | 2/2009 | Pena et al. | |
| 8,548,963 B2 | 10/2013 | Dettori et al. | |
| 9,052,820 B2 | 6/2015 | Jarrett et al. | |
| 9,104,440 B2 | 8/2015 | Jarrett et al. | |
| 9,146,670 B2 | 9/2015 | Zaman et al. | |
| 9,158,512 B1 | 10/2015 | Hucik et al. | |
| 9,557,909 B2 | 1/2017 | Elliott et al. | |
| 10,089,306 B1 | 10/2018 | Ryan et al. | |
| 10,592,318 B2 | 3/2020 | Christy Jesuraj et al. | |
| 10,592,319 B2 | 3/2020 | Sarid | |
| 10,747,505 B1 | 8/2020 | Lester et al. | |
| 2006/0123345 A1* | 6/2006 | Parimi | G06F 8/38 715/746 |
| 2009/0019522 A1 | 1/2009 | Cudich et al. | |
| 2011/0154287 A1 | 6/2011 | Mukkamala et al. | |
| 2011/0167403 A1* | 7/2011 | French | G06F 8/38 717/105 |
| 2013/0063446 A1* | 3/2013 | Lau | G06F 8/38 345/473 |
| 2014/0035945 A1* | 2/2014 | Anglin | G06F 3/14 345/619 |
| 2014/0143763 A1 | 5/2014 | Bhargava | |

(Continued)

OTHER PUBLICATIONS

Wehrmann, "Language-Agnostic Visual-Semantic Embeddings", 2019, IEEE (Year: 2019).*

(Continued)

*Primary Examiner* — Hossain M Morshed
(74) *Attorney, Agent, or Firm* — Moore & Van Allen PLLC; Nicholas C. Russell (57) ABSTRACT

The present invention generally relates to the field of automated and flexible information extraction for assisted and streamlined development of computer code. The invention provides for accommodating coding representations of reusable utilities in a technology agnostic pattern so that, based on a specified coding stack, the technology agnostic embeddings can be decoded and deployed into developers' integrated development environment. The present invention includes a technologic agnostic digital wallet for developers capable of storing reusable components either from open source repositories or user-defined functions in an embedded pattern in a centralized storage platform such as cloud or hosted virtual desktop.

20 Claims, 7 Drawing Sheets

(56) References Cited

U.S. PATENT DOCUMENTS

| | | | |
|---|---|---|---|
| 2014/0289738 A1* | 9/2014 | Paliwal | G06F 9/44 |
| | | | 719/311 |
| 2016/0070457 A1 | 3/2016 | Furtwangler et al. | |
| 2021/0097472 A1* | 4/2021 | Inamdar | G06N 20/00 |
| 2021/0173624 A1* | 6/2021 | Krishnamoorthy | G06F 8/36 |

OTHER PUBLICATIONS

Behroozi, C., How to Design a Language-Agnostic Cross-Platform Computer Vision SDK: A Hands-On Tutorial, Medium.com, Oct. 21, 2020, https://medium.com/trueface-ai/how-to-design-a-language-agnostic-cross-platform-computer-vision-sdk-e437ecac8b4e.

Pattankar, M., et al., Technology agnostic, Mastering ASP.NET Web API, Aug. 2017.

github.com, Gomah / bulmil: An agnostic UI components library based on Web Components, made with Bulma & Stencil, Jun. 13, 2020, https://github.com/gomah/bulmil.

github.com, Tallyb / reusable-components-styleguide, Mar. 8, 2020, https://github.com/Tallyb/reusable-components-styleguide.

* cited by examiner

SYSTEMS AND METHODS FOR ASSISTED CODE DEVELOPMENT

FIELD OF THE INVENTION

The present invention generally relates to the field of automated and flexible information extraction for review and analysis of computer code.

BACKGROUND

Current system and methods for code development may include developers utilizing a large majority of functions which are completely redundant or otherwise partially reusable. For example, when implementing a particular project workflow, it may comprise date utilities, file adapters, function skeletons, string related functions, regular expression methods, mathematical options, or the like. There is a need for a tool which provides centralized storage of language agnostic intelligent code recommendations in order to provide a more efficient code development workflow.

BRIEF SUMMARY

The following presents a simplified summary of one or more embodiments of the invention in order to provide a basic understanding of such embodiments. This summary is not an extensive overview of all contemplated embodiments, and is intended to neither identify key or critical elements of all embodiments, nor delineate the scope of any or all embodiments. Its sole purpose is to present some concepts of one or more embodiments in a simplified form as a prelude to the more detailed description that is presented later.

The present invention addresses the above needs by providing a system, methods, and computer program products for accommodating the coding representations of reusable utilities in a technology agnostic pattern so that, based on a specified coding stack, the technology agnostic embeddings can be decoded and deployed into developers' integrated development environment. The present invention includes a technologic agnostic digital wallet for developers capable of storing reusable components either from open source repositories or user-defined functions in an embedded pattern in a centralized storage platform such as cloud or hosted virtual desktop. When a developer wants to use the utility in a specific technology stack, a simple call to storage through minimalistic arguments will generate the response of appropriate code on specified programming language. Embodiments of the present invention comprise systems, methods, and computer program products that address these and/or other needs by providing an innovative and unique platform for analyzing, classifying, extracting, and processing information using multichannel input from user devices. Embodiments of the inventions are configured to provide a utility for assisted code development.

The system and methods generally comprise: receiving one or more coded functions in a first coding language; vectorizing the received one or more coded functions to produce vectorized code functions; performing a statistical distribution assessment on the one or more coded functions to determine a z score for each of the vectorized code functions; ranking the vectorized code functions based on the z score for each of the vectorized code functions; and transmitting to a user device a list of recommended functions for generation of language agnostic code embeddings, wherein the list of recommended functions contains a subset of the vectorized code functions.

In some embodiments, the subset of the vectorized code functions is determined based on the z score for the subset of the vectorized code functions being at or below a threshold z score.

In some embodiments, the list of recommended functions is ordered such that vectorized functions with the lowest z score are listed first.

In some embodiments, the invention further comprises receiving a request to generate language agnostic code embeddings for one or more functions of the list of recommended functions; generating a code abstract syntax tree for the one or more functions; encoding the code abstract syntax tree to generate multiple code embeddings for the one or more functions; generate an encoder output containing the multiple code embeddings for the one or more functions; and store the encoder output in a database, wherein the database is remotely accessible over a network via one or more user devices.

In some embodiments, the encoder output is generated via one or more self-attention layers.

In some embodiments, the invention further comprises generating a string of concatenated coding snippets based on the code abstract syntax tree to preserve temporal features of the one or more coded functions.

In some embodiments, the encoder output is stored in a cloud database for remote access via the user device.

The features, functions, and advantages that have been discussed may be achieved independently in various embodiments of the present invention or may be combined with yet other embodiments, further details of which can be seen with reference to the following description and drawings.

BRIEF DESCRIPTION OF THE DRAWINGS

Having thus described embodiments of the invention in general terms, reference will now be made to the accompanying drawings, wherein:

DETAILED DESCRIPTION OF EMBODIMENTS OF THE INVENTION

Embodiments of the present invention will now be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements. Like numbers refer to elements throughout. Where possible, any terms expressed in the singular form herein are meant to also include the plural form and vice versa, unless explicitly stated otherwise. Also, as used herein, the term "a" and/or "an" shall mean "one or more," even though the phrase "one or more" is also used herein.

In some embodiments, an "entity" or "enterprise" as used herein may be any institution employing information technology resources and particularly technology infrastructure configured for large scale processing of electronic files, electronic technology event data and records, and performing/processing associated technology activities. In some instances, the entity's technology systems comprise multiple technology applications across multiple distributed technology platforms for large scale processing of technology activity files and electronic records. As such, the entity may be any institution, group, association, financial institution, establishment, company, union, authority or the like, employing information technology resources.

As described herein, a "user" is an individual associated with an entity. In some embodiments, a "user" may be an employee (e.g., an associate, a project manager, an IT specialist, a manager, an administrator, an internal operations analyst, or the like) of the entity or enterprises affiliated with the entity, capable of operating the systems described herein. In some embodiments, a "user" may be any individual, entity or system who has a relationship with the entity, such as a customer. In other embodiments, a user may be a system performing one or more tasks described herein.

In the instances where the entity is a financial institution, a user may be an individual or entity with one or more relationships affiliations or accounts with the entity (for example, a financial institution). In some embodiments, the user may be an entity or financial institution employee (e.g., an underwriter, a project manager, an IT specialist, a manager, an administrator, an internal operations analyst, bank teller or the like) capable of operating the system described herein. In some embodiments, a user may be any individual or entity who has a relationship with a customer of the entity or financial institution. For purposes of this invention, the term "user" and "customer" may be used interchangeably. A "technology resource" or "account" may be the relationship that the user has with the entity. Examples of technology resources include a deposit account, such as a transactional account (e.g. a banking account), a savings account, an investment account, a money market account, a time deposit, a demand deposit, a pre-paid account, a credit account, a non-monetary user account that includes only personal information associated with the user, or the like. The technology resource is typically associated with and/or maintained by an entity.

As used herein, a "user interface" or "UI" may be an interface for user-machine interaction. In some embodiments the user interface comprises a graphical user interface. Typically, a graphical user interface (GUI) is a type of interface that allows users to interact with electronic devices such as graphical icons and visual indicators such as secondary notation, as opposed to using only text via the command line. That said, the graphical user interfaces are typically configured for audio, visual and/or textual communication. In some embodiments, the graphical user interface may include both graphical elements and text elements. The graphical user interface is configured to be presented on one or more display devices associated with user devices, entity systems, processing systems and the like. In some embodiments the user interface comprises one or more of an adaptive user interface, a graphical user interface, a kinetic user interface, a tangible user interface, and/or the like, in part or in its entirety.

Figure 1:
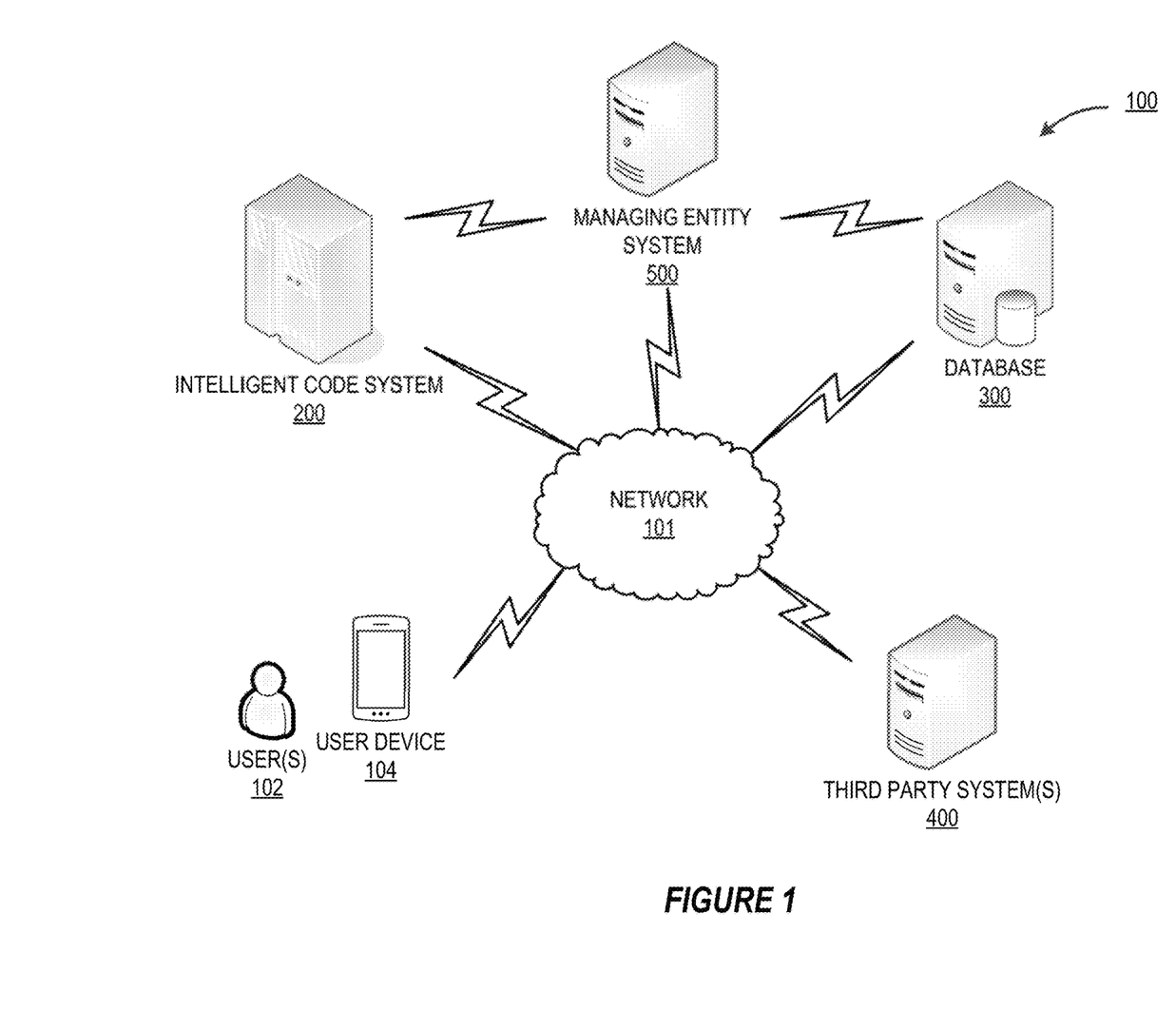
FIG. 1 depicts a system environment, in accordance with one embodiment of the present invention.

FIG. 1 illustrates an operating environment for the assisted code development system, in accordance with one embodiment of the present disclosure. As illustrated, the operating environment 100 may comprise a user 102 and/or a user device 104 in operative communication with one or more third party systems 400 (e.g., web site hosts, registry systems, third party entity systems, or the like). The operative communication may occur via a network 101 as depicted, or the user 102 may be physically present at a location separate from the various systems described, utilizing the systems remotely. The operating environment also includes a managing entity system 500, intelligent code system 200, a database 300, and/or other systems/devices not illustrated herein and connected via a network 101. As such, the user 102 may request information from or utilize the services of the intelligent code system 200, or the third party system 400 by establishing operative communication channels between the user device 104, the managing entity system 500, and the third party system 400 via a network 101.

Typically, the intelligent code system 200 and the database 300 are in operative communication with the managing entity system 500, via the network 101, which may be the internet, an intranet or the like. In FIG. 1, the network 101 may include a local area network (LAN), a wide area network (WAN), a global area network (GAN), and/or near field communication (NFC) network. The network 101 may provide for wireline, wireless, or a combination of wireline and wireless communication between devices in the network. In some embodiments, the network 101 includes the Internet. In some embodiments, the network 101 may include a wireless telephone network. Furthermore, the network 101 may comprise wireless communication networks to establish wireless communication channels such as a contactless communication channel and a near field communication (NFC) channel (for example, in the instances where communication channels are established between the user device 104 and the third party system 400). In this regard, the wireless communication channel may further comprise near field communication (NFC), communication via radio waves, communication through the internet, communication via electromagnetic waves and the like.

The user device 104 may comprise a desktop computer or mobile communication device, such as a cellular telecommunications device (i.e., a smart phone or mobile phone), a computing device such as a laptop computer, a personal digital assistant (PDA), a mobile internet accessing device, or other mobile device including, but not limited to portable digital assistants (PDAs), pagers, mobile televisions, desktop computers, laptop computers, cameras, video recorders, audio/video player, radio, GPS devices, any combination of the aforementioned, or the like. The user device is described in greater detail with respect to FIG. 2.

The managing entity system 500 may comprise a communication module and memory not illustrated, and may be configured to establish operative communication channels with a third party system 400 and/or a user device 104 via a network 101. The managing entity may comprise a data repository 256. The data repository 256 may contain code data, and may also contain user data. This user data may be used by the managing entity to authorize or validate the identity of the user 102 for accessing the system (e.g., via a username, password, biometric security mechanism, two-factor authentication mechanism, or the like). In some embodiments, the managing entity system is in operative communication with the intelligent code system 200 and database 300 via a private communication channel. The private communication channel may be via a network 101 or the intelligent code system 200 and database 300 may be fully integrated within the managing entity system 500, such as a virtual private network (VPN), or over a secure socket layer (SSL). The managing entity system 500 may be responsible for providing updates and configurations for the intelligent code system 200. While multiple entities may utilize the benefits and services of the intelligent code system 200, the managing entity system 500 has authoritative control over the intelligent code system 200 functions and access permissions. Database 300, as discussed later, may comprise an intelligent and dynamic source of information that may be called upon by any of the layers of the intelligent code system 200.

Figure 2:
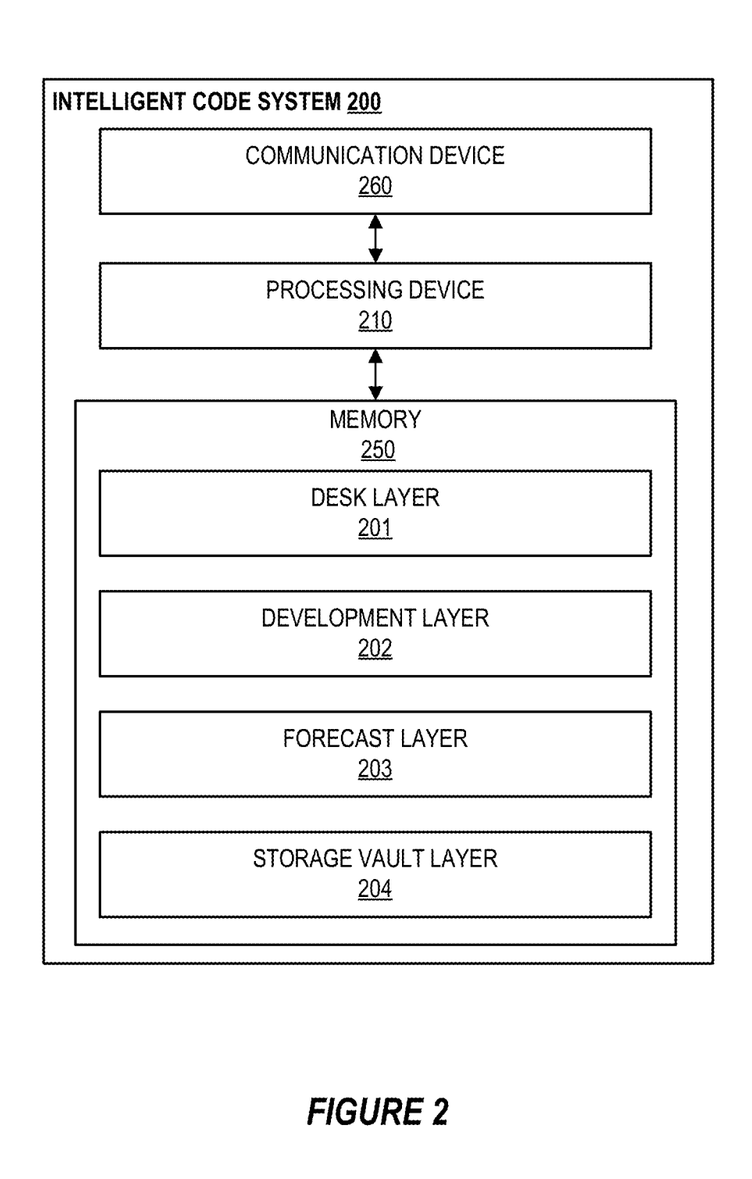
FIG. 2 is a block diagram illustrating the various layers of intelligent code system 200, in accordance with one embodiment of the present invention.

FIG. 2 is a block diagram illustrating the various layers of intelligent code system 200, in accordance with one embodiment of the present invention. The intelligent code system 200 may be accessed and configured using a mobile device 104 as described with regard to FIG. 3, but generally contains four technical layers which comprise the overall system solution. The processing device 210 may include functionality to operate one or more software programs or applications, which may be stored in the memory 250. For example, the processing device 210 may be capable of operating applications which allow one or more user devices 104 to interface with the intelligent code system 200 via one or more communication channels over network 101. The user device 104 may transmit and receive data and instructions to or from the third party system 400, intelligent code system 200, and the managing entity system 500, and display received information which it receives from any of these systems via the user interface of the user device 104. The intelligent code system 200 may receive data from one or more systems or user devices via the communication device 260.

The processing device 210 may be configured to use the communication device 260 to communicate with one or more devices on a network 101 such as, but not limited to the third party system 400, the intelligent code system 200, and the managing entity system 500. In this regard the processing device 210 may be configured to provide signals to and receive signals from the communication device 260. The signals may include signaling information in accordance with the air interface standard of the applicable BLE standard, cellular system of the wireless telephone network and the like, that may be part of the network 101. In this regard, the user device 104 may be configured to operate with one or more air interface standards, communication protocols, modulation types, and access types. By way of illustration, the user device 104 may be configured to operate in accordance with any of a number of first, second, third, and/or fourth-generation communication protocols and/or the like. For example, the user device 104 may be configured to operate in accordance with second-generation (2G) wireless communication protocols IS-136 (time division multiple access (TDMA)), GSM (global system for mobile communication), and/or IS-95 (code division multiple access (CDMA)), or with third-generation (3G) wireless communication protocols, such as Universal Mobile Telecommunications System (UMTS), CDMA2000, wideband CDMA (WCDMA) and/or time division-synchronous CDMA (TD-SCDMA), with fourth-generation (4G) wireless communication protocols, and/or the like. The user device 104 may also be configured to operate in accordance with non-cellular communication mechanisms, such as via a wireless local area network (WLAN) or other communication/data networks. The user device 104 may also be configured to operate in accordance Bluetooth® low energy, audio frequency, ultrasound frequency, or other communication/data networks.

In some instances, various features and functions of the invention are described herein with respect to a "system." In some instances, the system may refer to the intelligent code system 200 performing one or more steps described herein in conjunction with other devices and systems, either automatically based on executing computer readable instructions of the memory device 250, or in response to receiving control instructions from the managing entity system 500 or user device 104. In some instances, the system refers to the devices and systems on the operating environment 100 of FIG. 1.

Also shown in FIG. 2 are various layers 201, 202, 203, and 204. As shown in block 201, the intelligent code system 200 includes a desk layer 201. This layer accepts the user parameters such as programming stack, utilities, specified storage location, output storage location, and other destination related arguments along with various access parameters, or the like. Shown in block 202 is the development layer. This is a core processing layer which converts code into language agnostic code embeddings along with self-attention layers and generates associated embeddings. The development layer also generates a bundle in which it compiles a multi-layered decoder into an executable C++ code along with associated embeddings. Also shown is forecast layer 203. Forecast layer 203 identifies a pattern in which the user may be submitting various requests to the intelligent code system 200. The forecast layer 203 has the capability to scan for and identify intelligently specific capabilities the user is likely interested in, and acts as a recommendation engine for providing intelligent code recommendations. Also shown in FIG. 2 is storage vault layer 204. Storage vault layer 204 serves the function of a deployment unit. The storage vault layer 204 carries the executable code, along with associated embeddings, to the user device 104. Based on a specified tech stack of the user, the embeddings are decoded and expanded in developer integrated development environment (or "IDE") upon invocation by the user, and are carried to the IDE from the storage vault layer.

Figure 3:
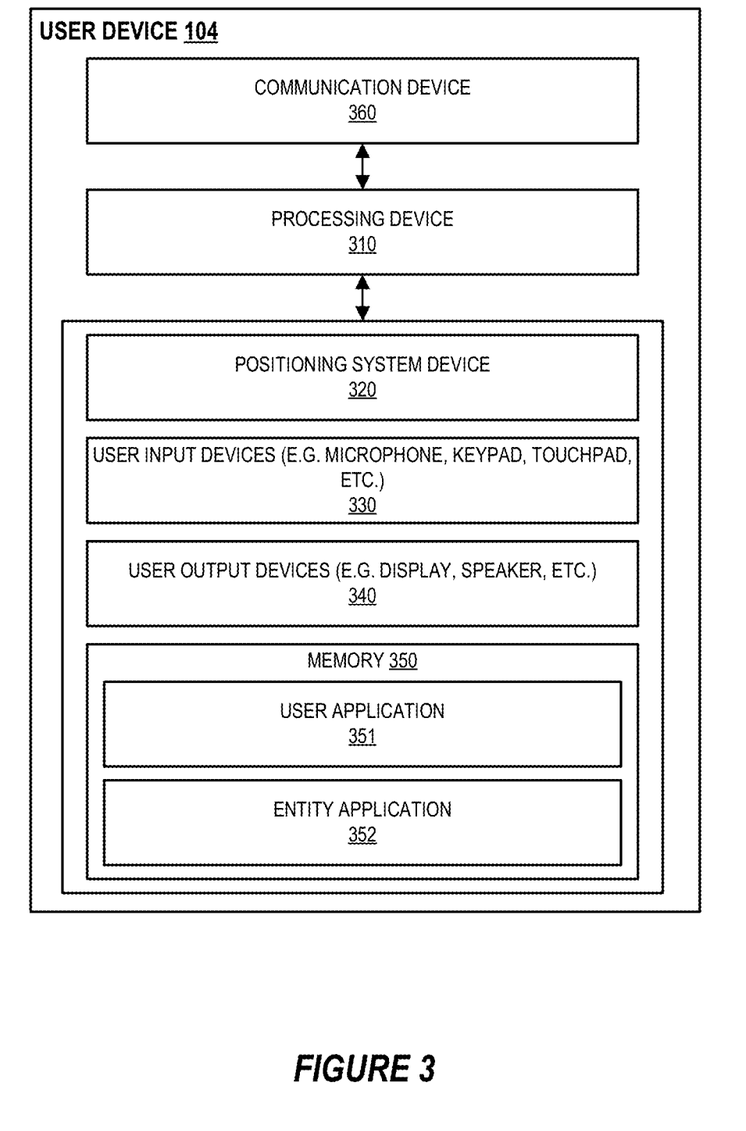
FIG. 3 is a block diagram illustrating a user device associated with the intelligent code system 200, in accordance with one embodiment of the present invention.

FIG. 3 is a block diagram illustrating a user device associated with the intelligent code system 200, in accordance with one embodiment of the present invention. The user device 104 may include a user computers or mobile devices, or the like. A "mobile device" 104 may be any mobile communication device, such as a cellular telecommunications device (i.e., a cell phone or mobile phone), personal digital assistant (PDA), a mobile Internet accessing device, or another mobile device including, but not limited to portable digital assistants (PDAs), pagers, mobile televisions, laptop computers, cameras, video recorders, audio/video player, radio, GPS devices, any combination of the aforementioned devices. The user device 104 may generally include a processor or processing device 310 communicably coupled to devices such as, memory 350, user output devices 340 (for example, a user display or a speaker), user input devices 330 (such as a microphone, keypad, touchpad, touch screen, and the like), a communication device or network interface device 360, a positioning system device 320, such as a geo-positioning system device like a GPS device, an accelerometer, and the like, one or more chips, and the like. Generally, in most embodiments of the intelligent code system 200 described herein, the user device 104 represents a computer, such as a laptop or desktop device, that a user or developer may use for code development purposes, and is where the user 102 may interact with an IDE.

The processing device 310 may include functionality to operate one or more software programs or applications, which may be stored in the memory 350. For example, the processing device 310 may be capable of operating applications such as a user application 351, an entity application 352, or a web browser application. The user application 351 or the entity application may then allow the user device 104 to transmit and receive data and instructions to or from the third party system 400, intelligent code system 200, and the managing entity system 500, and display received information via the user interface of the user device 104. The user application 352 may further allow the user device 104 to transmit and receive data to or from the managing entity system 500 data and instructions to or from the intelligent code system 200, web content, such as, for example, location-based content and/or other web page content, according to a Wireless Application Protocol (WAP), Hypertext Transfer Protocol (HTTP), and/or the like. The user application 352 may allow the managing entity 500 to present the user 102 with a plurality of recommendations, identified trends, suggestions, transaction data, pattern data, graph data, statistics, and/or the like for the user to review. In some embodiments, the user interface displayed via the user application 351 or entity application 352 may be entity specific. For instance, while the intelligent code system 200 may be accessed by multiple different entities, it may be configured to present information according to the preferences or overall common themes or branding of each entity system of third party system. In some embodiments, the user device 104 may be used to connect to the intelligent code system through a virtual machine environment, wherein the managing entity system 500, or a third party system 400 hosts a cloud computing device for interfacing with the user device over network 101, allowing the managing entity system increased device management control and permissions control versus use of a user application locally stored on the user device 104.

The processing device 310 may be configured to use the communication device 360 to communicate with one or more devices on a network 101 such as, but not limited to the third party system 400, the intelligent code system 200, and the managing entity system 500. In this regard the processing device 310 may be configured to provide signals to and receive signals from the communication device 360. The signals may include signaling information in accordance with the air interface standard of the applicable BLE standard, cellular system of the wireless telephone network and the like, that may be part of the network 101. In this regard, the user device 104 may be configured to operate with one or more air interface standards, communication protocols, modulation types, and access types. By way of illustration, the user device 104 may be configured to operate in accordance with any of a number of first, second, third, and/or fourth-generation communication protocols and/or the like. For example, the user device 104 may be configured to operate in accordance with second-generation (2G) wireless communication protocols IS-136 (time division multiple access (TDMA)), GSM (global system for mobile communication), and/or IS-95 (code division multiple access (CDMA)), or with third-generation (3G) wireless communication protocols, such as Universal Mobile Telecommunications System (UMTS), CDMA2000, wideband CDMA (WCDMA) and/or time division-synchronous CDMA (TD-SCDMA), with fourth-generation (4G) wireless communication protocols, and/or the like. The user device 104 may also be configured to operate in accordance with non-cellular communication mechanisms, such as via a wireless local area network (WLAN) or other communication/data networks. The user device 104 may also be configured to operate in accordance Bluetooth® low energy, audio frequency, ultrasound frequency, or other communication/data networks.

The communication device 360 may also include a user activity interface presented in user output devices 340 in order to allow a user 102 to execute some or all of the processes described herein. The application interface may have the ability to connect to and communicate with an external data storage on a separate system within the network 101. The user output devices 340 may include a display (e.g., a liquid crystal display (LCD) or the like) and a speaker 334 or other audio device, which are operatively coupled to the processing device 310. The user input devices 330, which may allow the user device 104 to receive data from the user 102, may include any of a number of devices allowing the user device 104 to receive data from a user 102, such as a keypad, keyboard, touch-screen, touchpad, microphone, mouse, joystick, other pointer device, button, soft key, and/or other input device(s).

The user device 104 may also include a memory buffer, cache memory or temporary memory device 350 operatively coupled to the processing device 310. Typically, one or more applications 351 and 352, are loaded into the temporarily memory during use. As used herein, memory may include any computer readable medium configured to store data, code, or other information. The memory device 350 may include volatile memory, such as volatile Random Access Memory (RAM) including a cache area for the temporary storage of data. The memory device 420 may also include non-volatile memory, which can be embedded and/or may be removable. The non-volatile memory may additionally or alternatively include an electrically erasable programmable read-only memory (EEPROM), flash memory or the like.

In some instances, various features and functions of the invention are described herein with respect to a "system." In some instances, the system may refer to the intelligent code system 200 performing one or more steps described herein in conjunction with other devices and systems, either automatically based on executing computer readable instructions of the memory device 250, or in response to receiving control instructions from the managing entity system 500. In some instances, the system refers to the devices and systems on the operating environment 100 of FIG. 1. The features and functions of various embodiments of the invention are be described below in further detail. It is understood that the servers, systems, and devices described herein illustrate one embodiment of the invention. It is further understood that one or more of the servers, systems, and devices can be combined in other embodiments and still function in the same or similar way as the embodiments described herein.

Figure 4:
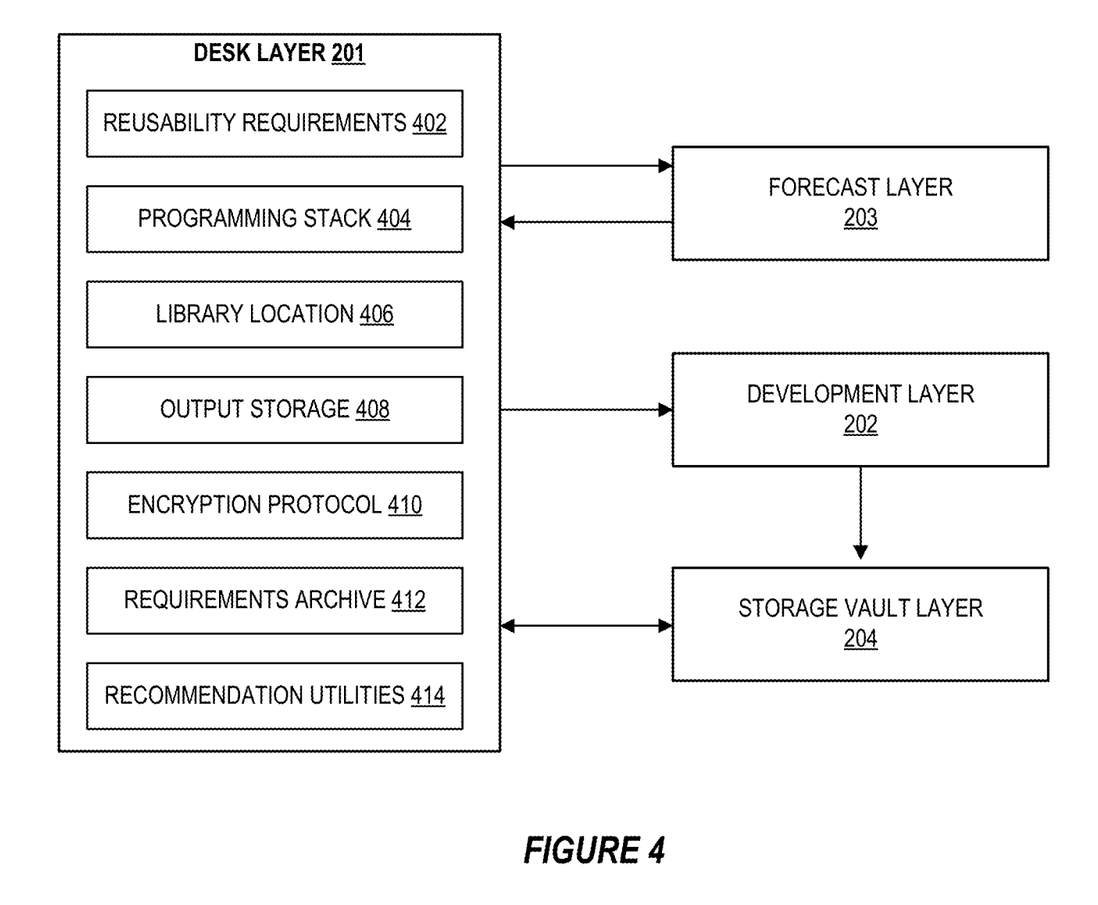
FIG. 4 is a block diagram illustrating the intercommunication between the various components of the desk layer and other system layers, in accordance with one embodiment of the present invention.

FIG. 4 is a block diagram illustrating the intercommunication between the various components of the desk layer and other system layers, in accordance with one embodiment of the present invention. The desk layer 201 or developer desk layer is responsible for accepting user parameters from the user IDE and acts as the user's input method for configuring various aspects of the system for their specific workflow or preferences. User parameters may include programming stack, utilities, specified library location, output storage locations, or the like, as well as other destination related arguments and access parameters. As shown in FIG. 4, the desk layer 201 may include user inputs for various parameters such as reusability requirements 402, programming stack 404, library location 406, output storage 408, encryption protocol 410, requirements archive 412, and recommendation utilities 414.

It is understood that reusability requirements 402 may be dynamic, such that the requirements may change or alter based on each workflow or project the user is currently working on. For instance, the user or developer may require the reuse of certain commands, data retrievals, data manipulations, data conversion, mathematical formulas, data generation, or the like, and may require these functions or commands in multiple coding languages in a single project development workflow. For example, when a Java user implements a particular project workflow, it may include date utilities, file adapters, function skeletons, string related functions, regex methods, mathematical options, or the like. The system 200 may allow the user to select or opt into certain requirements for reusability requirements 402 in order to optimize their time and expend less effort overall during the project workflow. Requirements archive 412 may be utilized by the user in order to store reusability requirements and later reference those same or similar requirements for future workflows. It is understood that the requirements archive 412 may interface via an application programming interface (API) with the storage vault layer 204, later discussed in more detail, in order obtain decoded function strings in various languages based on a stored database of language agnostic code embeddings organized in a digital wallet 700.

Other parameters the user may configure include programming stack 404, library location 406, output storage 408, and encryption protocol 410. The programming stack 404 may dictate which languages or functions are relevant to the user's current workflow. For instance, while certain reusability requirements 402 may exist in general, the programming stack 404 may indicate full stack requirements of a particular workflow, including multiple coding languages and development platforms. Ordinarily the user would need the versatile skills of a full stack workflow (e.g., proficient in multiple development platforms, or the like). However, in embodiments of the present invention, implementation of the intelligent code system 200 is able to generate and store language agnostic coding representation embeddings of reusable functions so that, based on the requirements of a specified coding stack, the tech agnostic embeddings could be decoded and deployed into a user's or developer's IDE, allowing the user to convert seamlessly between coding languages and preserve function utility.

The user or developer may also configure where the project workflow files are stored, using library location 406, and where the output data should be generated and stored, using output storage 408. In addition, certain workflows handling sensitive data may require a specific encryption protocol 410, as can be modified or selected by the user or developer through the desk layer 201. Recommendation utilities 414 allows the user or developer to manage a digital wallet which is capable of storing language agnostic reusable functions either from open source repositories or user defined functions in an embedded pattern in a centralized storage platform, such as cloud, hosted virtual desktop, or the like. When the user wishes to call up a reusable function in a specific technology stack, a simple call to storage through representational state transfer application programming interface (or "REST API") can be implemented via the recommendation utilities 414. With minimalistic arguments, the intelligent code system 200 will generate the response of appropriate code in a requested language via the various external decoder components of the system 200.

Figure 5:
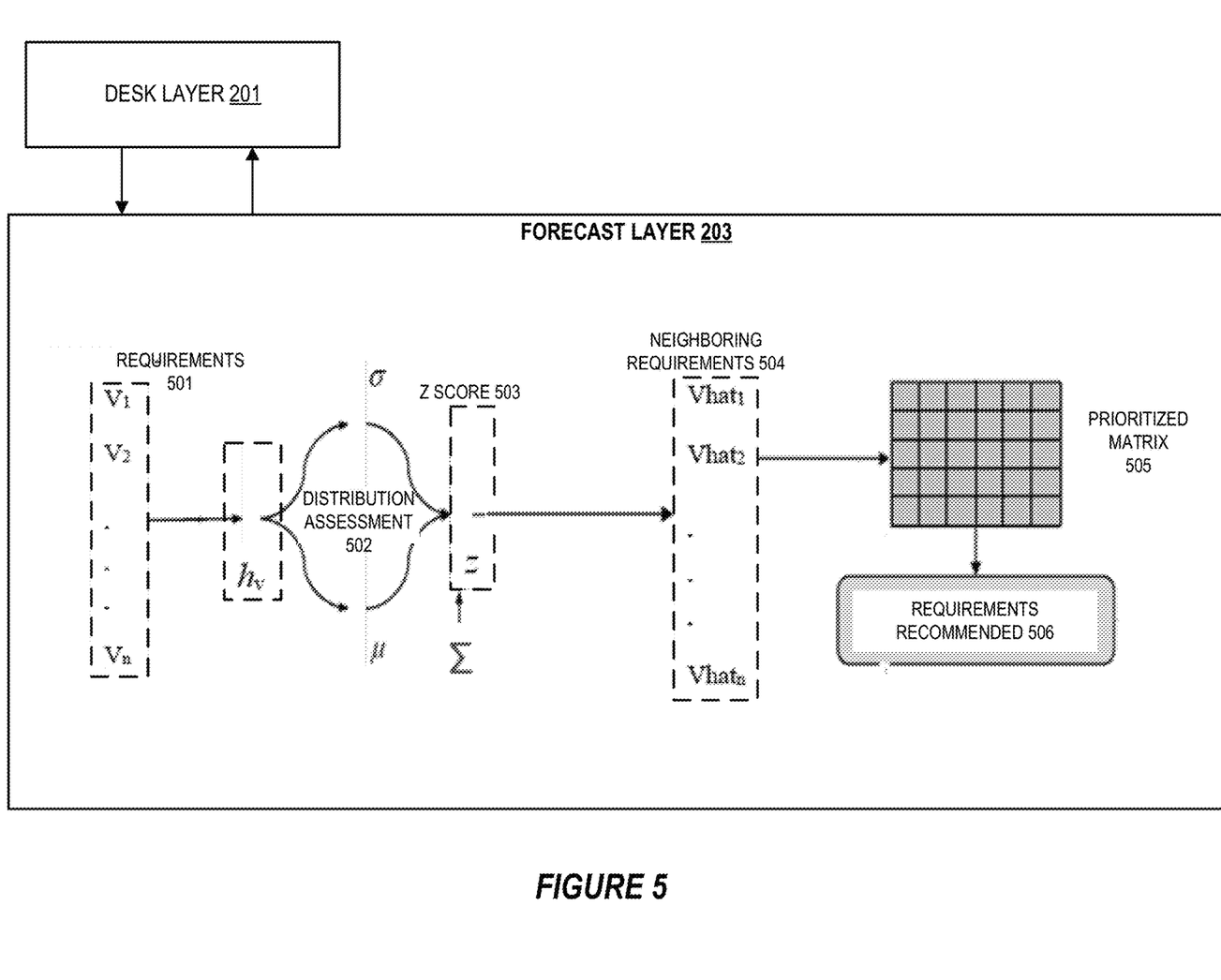
FIG. 5 is a block diagram illustrating the intercommunication between the various components of the forecast layer and other system layers, in accordance with one embodiment of the present invention.

FIG. 5 is a block diagram illustrating the intercommunication between the various components of the forecast layer and other system layers, in accordance with one embodiment of the present invention. As shown, the desk layer 201 interfaces with the forecast layer 203 via a two way communication channel such that the user or developer may transmit or share data and commands to the forecast layer 203, which acts as a recommendation engine for the user or developer during their workflow to identify and recommend certain potentially-reusable functions and present those recommendations to the user in a prioritized fashion. In some embodiments, the user may have exhausted available reusable functions from the available storage vault layer 204 because the user has already implemented all reusable functions which have been coded for use. The forecast layer 203 is tasked with identifying reusable functions in the workflow so that user does not have to go through the coding logic to manually identify potentially-reusable functions. With the help of distribution assessment, the forecast layer will identify recurring functions that the user or developer is using repeatedly or which perform repeated similar functions, and which are not already existing in the storage vault as decodable reusable functions. The forecast layer 203 may query the user or developer to provide the coding or function sequence such that the system may attempt to identify good candidates for generating language agnostic embeddings. The forecast layer produces a prioritized matrix 505 with a respective degree of potential reusability that the user may accept or deny. If the user or developer accepts, corresponding language agnostic code for the requirements will be mapped with some manual input of the user or developer, as discussed in FIGS. 6-7 (e.g., the user or developer may submit the recommended functions to the development layer 202 for further processing and storage of encoded indices). In this way, the forecast layer assists with the semi-automated identification of potentially reusable functions.

The forecast layer 203 receives code or function data from the desk layer 201, and vectorized the received data. By vectorizing the available coding language based on functions or subfunctions, as indicated by vectorized function components $V_1$, $V_2$, and $V_n$, the system may then perform a distribution assessment 502 on overall vector in order to determine a sigma and mu value, wherein sigma represents a measurement of standard deviation, and mu represents a mean value, and wherein the distance from the mean in terms of standard deviation is used to determine a z score 503, which represents a measure of how many standard deviations from the mean the raw function data is determined to be. In this way, the forecast layer may identify functions which are not only repeated functions throughout the workflow, but which also appear to represent a mathematical similarity in function to a set of existing reusable functions, which will potentially make them appropriate candidates for a decodable language agnostic mapping. As shown by capital sigma ("Σ"), the z score 503 is compared to a threshold standard deviation distance such that a prioritized matrix 505 of potentially reusable functions or subfunctions can be generated and prioritized by those which have a relatively small z score 503, or which have a z score 503 below some given threshold. The system may then transmit the identified potentially reusable functions to the user device to present the user or developer, via the desk layer, with either all or some prioritized potentially reusable functions. As shown in FIG. 5, the forecast layer 203 may also derive neighboring requirements 504, as shown by V-hat$_1$, V-hat$_2$, and V-hat$_n$, which are neighboring functions to the vectorized functions V$_1$, V$_2$, and V$_n$. This expands the scope of identifiable reusable function requirements. The user may review and select the requirements recommended 506 in order to utilize the development layer 202 to generate language agnostic encodings for the functions which may be stored in a digital wallet for convenient access by the user or developer at a later time. With minimalistic arguments, the intelligent code system 200 will generate the response of appropriate code on specified programming language via the various external decoder components of the system.

Figure 6:
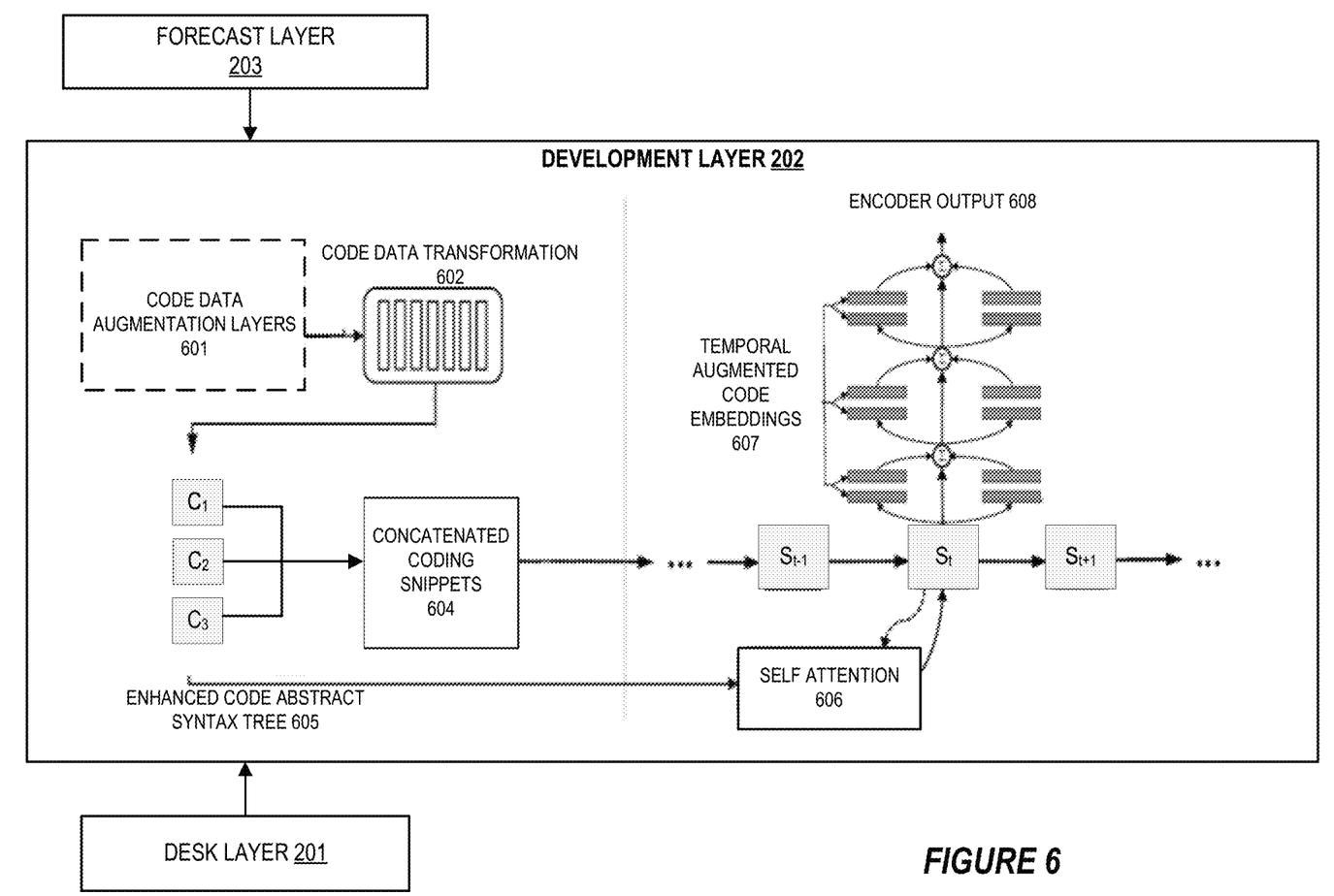
FIG. 6 is a block diagram illustrating the intercommunication between the various components of the development layer and other system layers, in accordance with one embodiment of the present invention.

FIG. 6 is a block diagram illustrating the intercommunication between the various components of the development layer and other system layers, in accordance with one embodiment of the present invention. As shown in FIG. 6, the user or developed may select candidate functions from requirements recommended 506 of the forecast layer 203 to be fed to the development layer 202. As shown, the user or developer may instruct for the transmission of function data from the forecast layer 203 to the development layer 202. Shown in FIG. 6 are system generated code data augmentation layers 601. The number of code data augmentation layers 601 depends on the number of functions submitted from the forecast layer 203, which the forecast layer 203 has vectorized and manipulated to generate code data transformation 602. The code data transformation 602 from the forecast layer 203 may be directly fed an enhanced code abstract syntax tree 605.

In some embodiments, the user may manually select functions to submit from the desk layer 201 to the development layer 202, as shown in FIG. 6. In such embodiments, the code functions C$_1$, C$_2$, and C$_3$ represent functions which the user or developer wishes to create reusable functions for. In this embodiment, there are three functions which will be analyzed in order to generate encoder output 608 which is stored in the storage vault layer 204. As shown, while the functions C$_1$, C$_2$, and C$_3$ are separated in the enhanced code abstract syntax tree 605, concatenated coding snippets 604 are preserved, as in most embodiments the functional coding language will be temporally sensitive. As such, each function is processed by self attention layer 606 as a function sequence, wherein each function is processed against the preceding and following function, indicated by S$_{t-1}$, S$_t$, and S$_{t+1}$, wherein S$_{t-1}$ is the preceding function, S$_t$ is the function, and S$_{t+1}$ is the following function. As shown in FIG. 6, this allows the system to generate temporal augmented code embeddings 607 via an encoding step of the self attention layer to generate encoder output 608 which comprise language agnostic encoding indices for the reusable functions.

Figure 7:
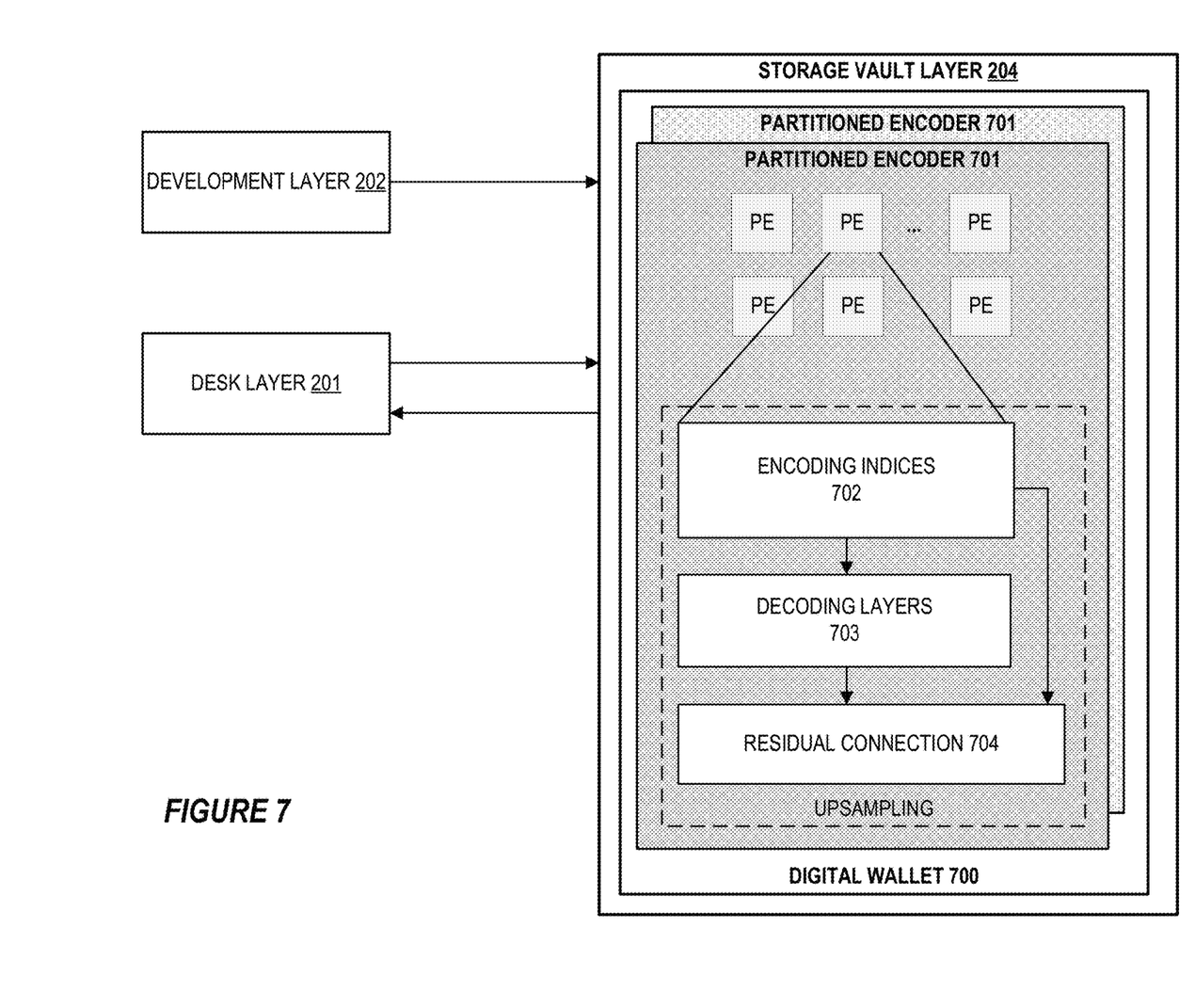
FIG. 7 is a block diagram illustrating the intercommunication between the various components of the storage vault layer and other system layers, in accordance with one embodiment of the present invention.

FIG. 7 is a block diagram illustrating the intercommunication between the various components of the storage vault layer and other system layers, in accordance with one embodiment of the present invention. The storage vault layer 204 is a database of encoding indices for various reusable functions generated by the development layer 202. This allows the user or developer to access digital wallet 700 which is capable of storing language agnostic reusable function encoding indices 702 either from open source repositories or user defined functions in an embedded pattern in a centralized storage platform, such as cloud, hosted virtual desktop, or the like. When the user wishes to call up a language agnostic reusable function in a specific technology stack, a simple call to storage through representational state transfer application programming interface (or "REST API") can be implemented via the recommendation utilities 414 of desk layer 201. In a minimalistic fashion, the intelligent code system 200 will generate the response of appropriate code on specified programming language via decoder components of the system, which are external to the encoding components of the development layer 202. Decoding layers 703 present in the digital wallet 700 are able to function as just-in-time (JIT) compilers for on-demand processing and are self-executable.

Also shown in FIG. 7 are partitioned encoders 701, which represent a mode of indexing various language agnostic encoding indices 702 which the development layer 202 has generated for reusable functions. For example, three partitioned encoders 701 are shown in FIG. 7, representing three different embeddings stored in the storage vault layer 204 which match the functions submitted by the user in the request for decoding into a given programming language. For instance, the user may submit three functions which the user wishes to decode in a Python coding language. Encoding indices 702 are partitioned for each function in corresponding partitioned encoders 701. The decoding layers 703 act to convert the language agnostic encoding indices 702 to a Python representation of the submitted functions. In such an embodiment, once the Python representations are generated, data refinement in the form of upsampling is performed. For example, in a date-function, the function may have many subfunctions, and the decoding layers 703 may generate multiple date functions for a single date function request due to the many subfunctions. The multiple generated date functions would then be compared against the encoding indices with the help of a residual connection 704, and a single function would be selected and shared with the user or developer based on that function having a maximum probability of matching the submitted function request. The system may determine the probability for each of the multiple generated functions based on comparison of the functions to the originally submitted function language, or by comparing the multiple generated functions to the language of the encoding indices 702. For example, three functions may be generated, the first containing a 90% statistical similarity to the original function or encoding indices 702, a second containing 50%, and a third containing only 30%. In this instance, only the first function is transmitted to the user as decoded output, as the 90% statistical similarity is interpreted as being correlated with a higher probability of matching the user's submitted request. This statistical comparison and selection of the function with the highest probability of a match to the user's request is referred to as upsampling.

As will be appreciated by one of ordinary skill in the art, the present invention may be embodied as an apparatus (including, for example, a system, a machine, a device, a computer program product, and/or the like), as a method (including, for example, a business process, a computer-implemented process, and/or the like), or as any combination of the foregoing. Accordingly, embodiments of the present invention may take the form of an entirely software embodiment (including firmware, resident software, microcode, and the like), an entirely hardware embodiment, or an embodiment combining software and hardware aspects that may generally be referred to herein as a "system." Furthermore, embodiments of the present invention may take the form of a computer program product that includes a computer-readable storage medium having computer-executable program code portions stored therein. As used herein, a processor may be "configured to" perform a certain function in a variety of ways, including, for example, by having one or more special-purpose circuits perform the functions by executing one or more computer-executable program code portions embodied in a computer-readable medium, and/or having one or more application-specific circuits perform the function.

It will be understood that any suitable computer-readable medium may be utilized. The computer-readable medium may include, but is not limited to, a non-transitory computer-readable medium, such as a tangible electronic, magnetic, optical, infrared, electromagnetic, and/or semiconductor system, apparatus, and/or device. For example, in some embodiments, the non-transitory computer-readable medium includes a tangible medium such as a portable computer diskette, a hard disk, a random access memory (RAM), a read-only memory (ROM), an erasable programmable read-only memory (EPROM or Flash memory), a compact disc read-only memory (CD-ROM), and/or some other tangible optical and/or magnetic storage device. In other embodiments of the present invention, however, the computer-readable medium may be transitory, such as a propagation signal including computer-executable program code portions embodied therein.

It will also be understood that one or more computer-executable program code portions for carrying out the specialized operations of the present invention may be required on the specialized computer include object-oriented, scripted, and/or unscripted programming languages, such as, for example, Java, Perl, Smalltalk, C++, SAS, SQL, Python, Objective C, and/or the like. In some embodiments, the one or more computer-executable program code portions for carrying out operations of embodiments of the present invention are written in conventional procedural programming languages, such as the "C" programming languages and/or similar programming languages. The computer program code may alternatively or additionally be written in one or more multi-paradigm programming languages, such as, for example, F #.

It will further be understood that some embodiments of the present invention are described herein with reference to flowchart illustrations and/or block diagrams of systems, methods, and/or computer program products. It will be understood that each block included in the flowchart illustrations and/or block diagrams, and combinations of blocks included in the flowchart illustrations and/or block diagrams, may be implemented by one or more computer-executable program code portions.

It will also be understood that the one or more computer-executable program code portions may be stored in a transitory or non-transitory computer-readable medium (e.g., a memory, and the like) that can direct a computer and/or other programmable data processing apparatus to function in a particular manner, such that the computer-executable program code portions stored in the computer-readable medium produce an article of manufacture, including instruction mechanisms which implement the steps and/or functions specified in the flowchart(s) and/or block diagram block(s).

The one or more computer-executable program code portions may also be loaded onto a computer and/or other programmable data processing apparatus to cause a series of operational steps to be performed on the computer and/or other programmable apparatus. In some embodiments, this produces a computer-implemented process such that the one or more computer-executable program code portions which execute on the computer and/or other programmable apparatus provide operational steps to implement the steps specified in the flowchart(s) and/or the functions specified in the block diagram block(s). Alternatively, computer-implemented steps may be combined with operator and/or human-implemented steps in order to carry out an embodiment of the present invention.

While certain exemplary embodiments have been described and shown in the accompanying drawings, it is to be understood that such embodiments are merely illustrative of, and not restrictive on, the broad invention, and that this invention not be limited to the specific constructions and arrangements shown and described, since various other changes, combinations, omissions, modifications and substitutions, in addition to those set forth in the above paragraphs, are possible. Those skilled in the art will appreciate that various adaptations and modifications of the just described embodiments can be configured without departing from the scope and spirit of the invention. Therefore, it is to be understood that, within the scope of the appended claims, the invention may be practiced other than as specifically described herein.

The invention claimed is:

1. A system providing assisted code development, the system comprising:
    a module containing a memory storage device, a communication device, and a processor, with computer-readable program code stored thereon, wherein executing the computer-readable code is configured to cause the processor to:
    receive one or more functions in a first coding language;
    vectorize the received one or more functions to produce vectorized functions;
    perform a statistical distribution assessment on the one or more functions to determine a z score for each of the vectorized functions;
    rank the vectorized functions based on the z score for each of the vectorized functions; and
    transmit to a user device a list of recommended functions for generation of language agnostic code embeddings, wherein the list of recommended functions contains a subset of the vectorized functions.

2. The system of claim 1, wherein the subset of the vectorized functions is determined based on the z score for the subset of the vectorized functions being at or below a threshold z score.

3. The system of claim 1, wherein the list of recommended functions is ordered such that vectorized functions with the lowest z score are listed first.

4. The system of claim 1, further configured to:
    receive a request to generate language agnostic code embeddings for one or more functions of the list of recommended functions;
    generate an abstract syntax tree for the one or more functions;
    encode the abstract syntax tree to generate multiple code embeddings for the one or more functions;
    generate an encoder output containing the multiple code embeddings for the one or more functions; and
    store the encoder output in a database, wherein the database is remotely accessible over a network via one or more user devices.

5. The system of claim 4, wherein the encoder output is generated via one or more self-attention layers.

6. The system of claim 4, further configured to generate a string of concatenated coding snippets based on the abstract syntax tree to preserve temporal features of the one or more functions.

7. The system of claim 4, wherein the encoder output is stored in a cloud database for remote access via the user device.

8. A computer-implemented method providing assisted code development, the computer-implemented method comprising:
receiving one or more functions in a first coding language;
vectorizing the received one or more functions to produce vectorized functions;
performing a statistical distribution assessment on the one or more functions to determine a z score for each of the vectorized functions;
ranking the vectorized functions based on the z score for each of the vectorized functions; and
transmitting to a user device a list of recommended functions for generation of language agnostic code embeddings, wherein the list of recommended functions contains a subset of the vectorized functions.

9. The computer-implemented method of claim 8, wherein the subset of the vectorized functions is determined based on the z score for the subset of the vectorized functions being at or below a threshold z score.

10. The computer-implemented method of claim 8, wherein the list of recommended functions is ordered such that vectorized functions with the lowest z score are listed first.

11. The computer-implemented method of claim 8, further comprising:
receiving a request to generate language agnostic code embeddings for one or more functions of the list of recommended functions;
generating an abstract syntax tree for the one or more functions;
encoding the abstract syntax tree to generate multiple code embeddings for the one or more functions;
generate an encoder output containing the multiple code embeddings for the one or more functions; and
store the encoder output in a database, wherein the database is remotely accessible over a network via one or more user devices.

12. The computer-implemented method of claim 11, wherein the encoder output is generated via one or more self-attention layers.

13. The computer-implemented method of claim 11, further comprising generating a string of concatenated coding snippets based on the abstract syntax tree to preserve temporal features of the one or more functions.

14. The computer-implemented method of claim 11, wherein the encoder output is stored in a cloud database for remote access via the user device.

15. A computer program product providing assisted code development, the computer program product comprising at least one non-transitory computer-readable medium having computer-readable program code portions embodied therein, the computer-readable program code portions comprising:
an executable portion configured for receiving one or more functions in a first coding language;
vectorizing the received one or more functions to produce vectorized functions;
performing a statistical distribution assessment on the one or more functions to determine a z score for each of the vectorized functions;
ranking the vectorized functions based on the z score for each of the vectorized functions; and
transmitting to a user device a list of recommended functions for generation of language agnostic code embeddings, wherein the list of recommended functions contains a subset of the vectorized functions.

16. The computer program product of claim 15, wherein the subset of the vectorized functions is determined based on the z score for the subset of the vectorized functions being at or below a threshold z score.

17. The computer program product of claim 15, wherein the list of recommended functions is ordered such that vectorized functions with the lowest z score are listed first.

18. The computer program product of claim 15, further comprising:
an executable portion configured for receiving a request to generate language agnostic code embeddings for one or more functions of the list of recommended functions;
an executable portion configured for generating an abstract syntax tree for the one or more functions;
an executable portion configured for encoding the abstract syntax tree to generate multiple embeddings for the one or more functions;
an executable portion configured for generating an encoder output containing the multiple code embeddings for the one or more functions; and
an executable portion configured for storing the encoder output in a database, wherein the database is remotely accessible over a network via one or more user devices.

19. The computer program product of claim 18, wherein the encoder output is generated via one or more self-attention layers.

20. The computer-implemented method of claim 18, wherein the encoder output is stored in a cloud database for remote access via the user device.

* * * * *